United States Patent
Gerault et al.

[11] Patent Number: 5,881,140
[45] Date of Patent: Mar. 9, 1999

[54] APPARATUS AND METHOD OF DETERMINING SWITCH UTILIZATION WITHIN A TELECOMMUNICATIONS NETWORK

[75] Inventors: Bernard J. Gerault, Frisco; Meanhuy S. Chen, Plano, both of Tex.

[73] Assignee: DSC Telecom L.P., Plano, Tex.

[21] Appl. No.: 724,791

[22] Filed: Oct. 2, 1996

Related U.S. Application Data

[60] Provisional application No. 60/009,785 Jan. 16, 1996.

[51] Int. Cl.⁶ .................................................. H04M 15/00
[52] U.S. Cl. .......................... 379/137; 379/111; 379/113
[58] Field of Search .................................. 379/113, 221, 379/137, 230, 229, 133, 112, 111, 220, 222, 272, 273, 138, 139

[56] References Cited

U.S. PATENT DOCUMENTS

| | | | |
|---|---|---|---|
| 4,250,354 | 2/1981 | Karras | 379/137 |
| 4,626,625 | 12/1986 | Daisenberger | 379/137 |
| 4,788,721 | 11/1988 | Krishnan et al. | 379/221 |
| 4,907,256 | 3/1990 | Higuchi et al. | 379/137 |
| 4,931,941 | 6/1990 | Krishnan | 379/220 |
| 4,979,118 | 12/1990 | Kheradpir | 379/220 |
| 4,991,204 | 2/1991 | Yamamoto et al. | 379/221 |
| 5,042,064 | 8/1991 | Chung et al. | 379/113 |
| 5,060,258 | 10/1991 | Turner | 379/137 |
| 5,101,451 | 3/1992 | Ash et al. | 379/221 |
| 5,142,570 | 8/1992 | Chaudhary et al. | 379/221 |
| 5,295,183 | 3/1994 | Langlois et al. | 379/113 |
| 5,359,649 | 10/1994 | Rosu et al. | 379/220 |
| 5,425,086 | 6/1995 | Hidaka et al. | 379/139 |
| 5,521,971 | 5/1996 | Ke et al. | 379/137 |
| 5,539,815 | 7/1996 | Samba | 379/220 |
| 5,550,903 | 8/1996 | Chang | 379/115 |

*Primary Examiner*—Curtis A. Kuntz
*Assistant Examiner*—Rexford N. Barnie
*Attorney, Agent, or Firm*—Baker & Botts, L.L.P.

[57] ABSTRACT

A telecommunications network (10) includes a plurality of telecommunication switches (12). Each telecommunication switch (12) includes a set of processors (14) in order to provide a distributed architecture. A network processor (16) periodically communicates with each set of processors (14) of each telecommunication switch (12) to collect various switch and network information and respond with routing recommendations. These routing recommendations are provided in response to a switch utilization index determined for each telecommunication switch (12). The switch utilization index provides an up to date picture of the in service trunks and a realistic figure of the global load on the processors (14). The switch occupancy index is based on trunks, call attempts, time, and switch type and is defined as the ratio of new call arrival rate to the maximum call arrival rate for a dynamically controlled routing processing cycle.

13 Claims, 1 Drawing Sheet

APPARATUS AND METHOD OF DETERMINING SWITCH UTILIZATION WITHIN A TELECOMMUNICATIONS NETWORK

TECHNICAL FIELD OF THE INVENTION

The present invention relates in general to telecommunication systems and more particularly to an apparatus and method of determining switch utilization within a telecommunications network.

RELATED PATENT APPLICATION

This application claims the benefit of U.S. Provisional Application No. 60/009,785, filed on Jan. 16, 1996.

BACKGROUND OF THE INVENTION

Telecommunication switches currently in service in a telecommunications network are typically controlled by a generic software which uses a static routing algorithm. The static routing algorithm provides an inflexible method of transmitting telecommunications information from and through the telecommunication switches within the network. A static routing algorithm is typically used within a centralized architecture of telecommunication switches. A centralized architecture uses a central processing scheme to control and operate the telecommunication switches within the network. A centralized architecture using a static routing algorithm allows for a simple calculation of the load on each telecommunication switch, determining a switch occupancy for each switch. However, in a distributed architecture, processors are placed in each switch to operate and control the routing functions for the switch. Switch occupancy and processor load within a distributed architecture becomes a difficult calculation within a multi-processor distributed environment. Therefore, it is desirable to determine a switch occupancy in a distributed multi-processor architecture.

SUMMARY OF THE INVENTION

From the foregoing, it may be appreciated that a need has arisen to determine switch utilization during dynamically controlled routing operation in a telecommunications network having a distributed architecture. In accordance with the present invention, an apparatus and method of determining switch utilization within a telecommunications network are provided which substantially eliminate or reduce disadvantages and problems associated with centralized architectures using static routing algorithms.

According to an embodiment of the present invention, there is provided a method of determining switch utilization within a telecommunications network that includes tracking the number of incoming calls to a switch during a predefined time interval. A number of active trunks serving the switch and a maximum number of call attempts per busy hour per trunk for the switch are established. An actual number of call attempts per busy hour per trunk for the switch is also established. A switch occupancy index for the switch is determined in response to the number of incoming calls, the number of active trunks, and the lesser of the maximum number of call attempts per busy hour as compared to the actual number of call attempts per busy hour.

The present invention provides various technical advantages over centralized architecture techniques. For example, one technical advantage is to determine a switch occupancy index for a distributed architecture. Another technical advantage is to determine processor utilization in order to prevent overloads from occurring in the switch. Yet another technical advantage is to take into account and compensate for external factors that may interfere with the peak call handling capability of the switch. Other technical advantages are readily apparent to one skilled in the art from the following figures, descriptions, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
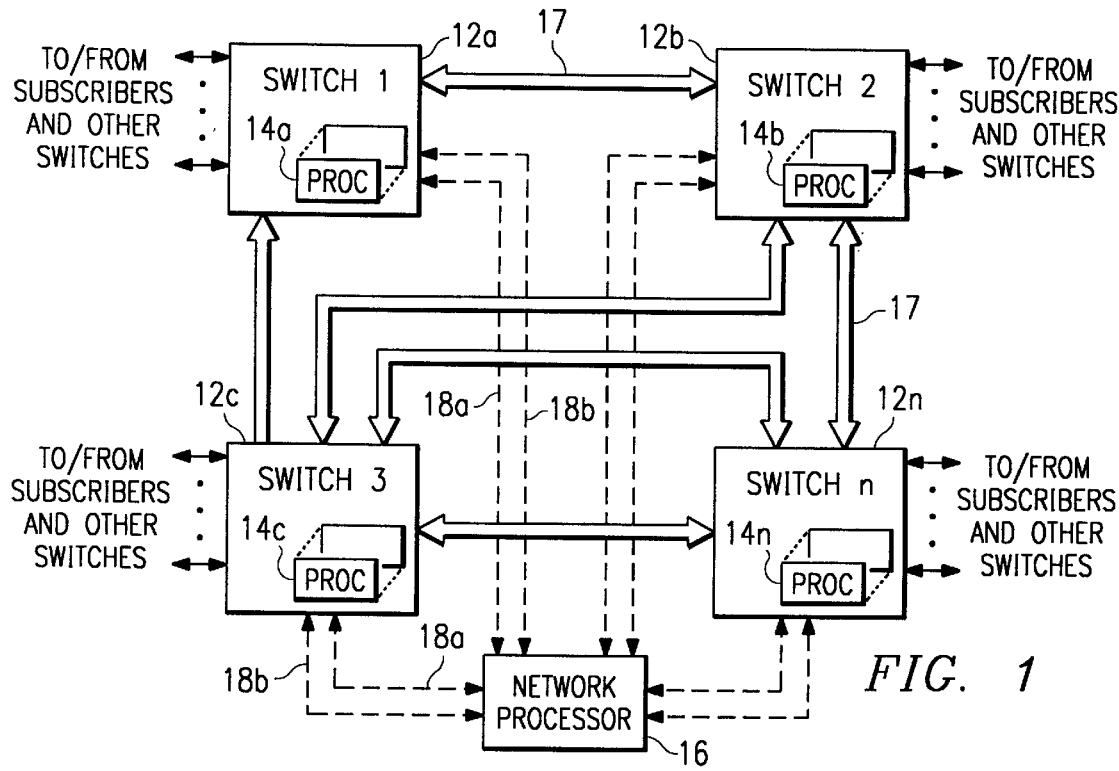
FIG. 1 illustrates a block diagram of a telecommunications network.

FIG. 1 is a block diagram of a telecommunications network 10. Telecommunications network 10 includes a plurality of telecommunication switches 12a–n connected in a network configuration to transport telecommunications information. Each telecommunication switch 12 provides telecommunications information between local subscribers serviced by the telecommunication switch 12 and between local and remote subscribers through interaction with other telecommunication switches 12. Each telecommunication switch 12 includes a set of processors 14 to control transportation of telecommunications information to and from subscribers and other switching elements. The processing and control of telecommunications network 10 is distributed among the plurality of telecommunication switches 12 through each set of processors 14. A network processor 16 communicates with all telecommunication switches 12 within telecommunications network 10 through corresponding processors 14.

Network processor 16 communicates periodically with each telecommunication switch 12 within telecommunications network 10 to collect various switch and network information and respond with routing recommendations. Network processor 16 implements a dynamically controlled routing feature in order to optimize usage of inter machine trunks 17 between telecommunication switches 12, increase the call completion rate within telecommunications network 10, and optimize utilization of telecommunications switches 12. Network processor 16 provides each telecommunications switch 12 with routing protocols to dynamically change the routing of telecommunications information within telecommunications network 10 in response to various factors, including congestion points and equipment operation.

Each telecommunication switch 12 is connected to network processor 16 with fully redundant data links 18a and 18b. Redundant data links 18a and 18b are dedicated point-to-point connections. Redundant data link 18b is provided as a backup in case redundant data link 18a fails. Network processor 16 selects one of redundant data links 18a and 18b as the active link. The active link is the link used by network processor 16 for priming telecommunications switches 12 into dynamically controlled routing operation and exchanging recommendation and congestion data with telecommunication switches 12. The link not selected as the active link is established as a standby link. Network processor 16 establishes the active link first before establishing the standby link.

Telecommunication switch 12 may initiate link transfer over from the active link to the standby link upon an indication that there is a communication failure between telecommunication switch 12 and network processor 16 in the active link. Telecommunication switch 12 transfers over to the standby link and resumes dynamically controlled routing operation, with the standby link becoming the new active link. Messages received on the former active link after transfer over has occurred are to be discarded and flagged as an error condition. Telecommunication switch 12 will also transfer over the link if it detects that network processor 16 is sending recommendation data on the standby link. Telecommunications switch 12 will not transfer over the link if it does not receive a recommendation or problems occur in the communications between telecommunications switch 12 and network processor 16 for a specified number of update cycles, telecommunications switch 12 is unable to encode or decode a message, or congestion data has not been transmitted to network processor 16 for a specified number of update cycles. In these instances, telecommunication switch 12 will revert to a switch based fix routing mode.

At predefined intervals, each processor 14 within telecommunication switches 12, or network processor 16 in response to information received from each processor 14, determines an up to date picture of the in service trunks and a realistic figure of the global load on processors 14. This determination produces a switch occupancy index for each set of processors 14 and corresponding telecommunications switch 12 within telecommunications network 10. This switch occupancy index is the ratio of the new call arrival rate to the maximum call arrival rate for a dynamically controlled routing processing cycle. The switch occupancy index provides an indication of processor utilization to prevent overloads and congestion at telecommunication switches 12. The switch occupancy index takes into account and compensates for external factors that may interfere with the peak switch call handling capability.

Figure 2:
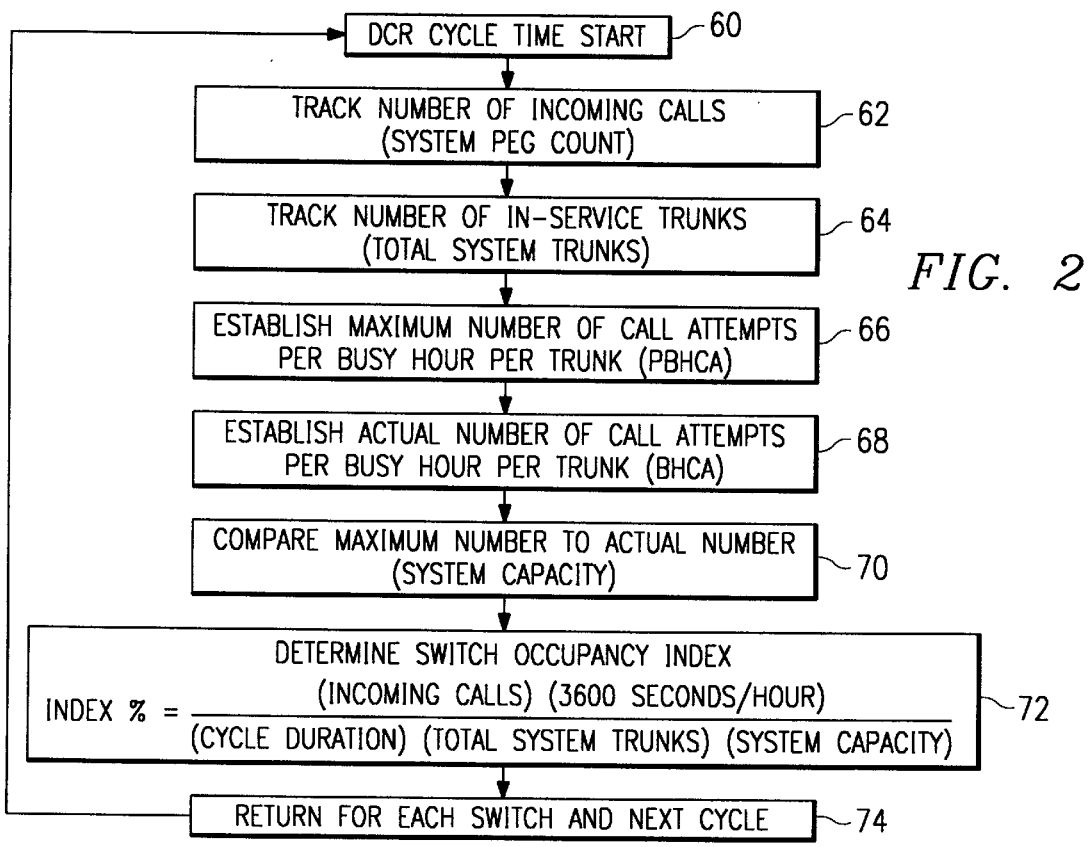
FIG. 2 illustrates a flow chart outlining a method to determine a switch occupancy index for each telecommunication switch within the telecommunications network.

FIG. 2 shows a flow chart for determining the switch occupancy index for an individual telecommunications switch 12. Process flow begins at block 60 where the start of a new dynamically controlled routing cycle begins. During a dynamically controlled routing cycle, a system peg count for the telecommunication switch 12 is determined at block 62 where the number of incoming calls to telecommunication switch 12 is tracked. The number of incoming calls includes all incoming calls into telecommunication switch 12 regardless of whether these calls are successfully completed or not.

The process flow proceeds to block 64 where the number of in service trunks servicing the telecommunication switch 12 during the dynamically controlled routing cycle is determined. The number of in service trunks includes those active trunks which are able to carry traffic regardless of whether they are idle or busy. The number of in service trunks does not include those trunks removed from service or in a maintenance state.

The process flow proceeds to block 66 where a peak busy hour call attempts per trunk parameter is established for telecommunication switch 12. The peak busy hour call attempts per trunk parameter is the maximum number of call attempts per busy hour per trunk for telecommunication switch 12. The peak busy hour call attempts per trunk parameter reflects the guaranteed switch performance capability in an operating environment not subject to external constraints.

Process flow proceeds to block 68 where the busy hour call attempts per trunk parameter is established. The busy hour call attempts per trunk parameter is the actual number of call attempts per busy hour per trunk for telecommunication switch 12. The busy hour call attempts per trunk parameter reflects the corrected switch capability in an environment subject to various constraints imposed by external factors not under the control of telecommunication switch 12. These external factors may include link capacity, billing file transport capacity, or other system level maximum throughput limitations.

Process flow proceeds to block 70 where the peak busy hour call attempts per trunk parameter is compared to the busy hour call attempts per trunk parameter. The lesser of these two parameters is used in determining the switch occupancy index. The switch occupancy index is determined at block 72. From the parameters collected by telecommunication switch 12, the switch occupancy index is determined in accordance with the following formula:

$$N\% = [\text{system peg count} \times 3600 \text{ seconds per hour} \times 100] \div$$

$$[DCR \text{ cycle time} \times \text{the total system trunks} \times \text{system capacity}].$$

Process flow proceeds to block 74 where the process is repeated for each telecommunication switch 12 within telecommunications network 10 and for the next dynamically controlled routing cycle.

In response to a determination of the switch occupancy index for each telecommunication switch 12 within telecommunications network 10, network processor 16 provides routing recommendations to each set of processors 14 within telecommunication switches 12 in order to dynamically control the routing of telecommunications information within telecommunications network 10. Routing recommendations are provided to each set of processors 14 by network processor 16 at the end of each dynamically controlled routing cycle. In this manner, network processor 16 can monitor the operational global load on processors 14 and adjust the processing capacity of telecommunication switches 12 in order to optimize operation of telecommunication network 10.

In summary, a network processor provides routing recommendations in a dynamically controlled routing environment in response to switch utilization indexes determined for each telecommunication switch within a telecommunication network. The switch utilization index provides an indication of the utilization and load on switch processors distributed at each telecommunication switch within the telecommunication network. The switch utilization index takes into account and compensates for external factors that may interfere with peak switch call handling capability.

Thus, it is apparent that there has been provided, in accordance with the present invention, an apparatus and method of determining switch utilization within a telecommunications network that satisfies the advantages set forth above. Although the preferred embodiment has been described in detail, it should be understood that various changes, substitutions, and alterations can be made herein. For example, the switch utilization index may be determined at each telecommunication switch or within the network processor communicating with each telecommunication switch. Other examples are readily apparent to one skilled in the art and may be made without departing from the spirit and scope of the present invention as defined by the following claims.

What is claimed is:

1. A method of determining switch utilization within a telecommunications network, comprising the steps of:

tracking a number of incoming calls to a switch of the telecommunications network during a pre-defined time interval;

establishing a number of active trunks serving the switch;

establishing a maximum number of call attempts per busy hour per trunk for the switch;

establishing an actual number of call attempts per busy hour per trunk for the switch;

determining a switch occupancy index for the switch in response to the number of incoming calls, the number of active trunks, and the lesser of the maximum number of call attempts per busy hour and the actual number of call attempts per busy hour, wherein said switch occupancy index is determined by the following equation:

Index={(# of incoming calls) (3600 seconds per hour) (100)}/{(pre-defined time interval)(# of active trunks) (maximum/actual number of call attempts)}.

2. The method of claim 1, wherein the maximum call attempts per busy hour per trunk represents a guaranteed performance capability of the switch in a network environment not subject to external constraints.

3. The method of claim 1, wherein the actual number of call attempts per busy hour per trunk represents a corrected performance capability of the switch in a network environment subject to external factors not controlled by the switch.

4. The method of claim 1, wherein the switch occupancy index represents a ratio of a new call arrival rate to a maximum call arrival rate of the switch for the pre-defined time interval.

5. The method of claim 1, further comprising the step of:

adjusting a capacity of the switch in response to the switch occupancy index.

6. The method of claim 1, wherein said tracking step includes tracking all incoming calls to the switch whether or not each call is successfully completed by the switch.

7. The method of claim 1, further comprising the step of:

providing the switch with new routing recommendations in response to the switch occupancy index.

8. The method of claim 1, further comprising the step of:

continuously determining the switch occupancy index of the switch for each successive pre-defined time interval.

9. The method of claim 1, wherein the number of active trunks includes trunks which are busy or idle and excludes trunks which are removed from service or in a maintenance state.

10. The method of claim 1, wherein a multiple stage call including a calling card call is counted as a single call attempt.

11. A telecommunications network, comprising:

a plurality of switches operable to route telecommunications signals to subscribers and other switches serviced by said plurality of switches;

a network processor operable to determine, control, recommend, and supervise routing of said telecommunications signals by said plurality of switches, each switch operable to periodically determine a switch occupancy index and provide said switch occupancy index to said network processor, said switch occupancy index representing a capacity load factor for a particular switch, said network processor operable to adjust a processing capacity of each of said plurality of switches in response to said switch occupancy index, wherein each switch tracks a number of incoming calls received over a pre-defined time interval, each switch tracking a number of active trunks served over said pre-defined time interval, each switch establishing a maximum number and an actual number of call attempts per busy hour per trunk over said pre-determined time interval, each switch determining said switch occupancy index in response to said number of incoming calls, said number of active trunks, and the lesser of said maximum number and actual number of call attempts per busy hour, wherein said switch occupancy index is determined by the following equation:

Index={(# of incoming calls) (3600 seconds per hour) (100)}/{(pre-defined time interval)(# of active trunks) (maximum/actual number of call attempts)}.

12. The telecommunications network of claim 11, wherein said maximum number of call attempts represents a guaranteed capability of each switch without constraint from external factors and said actual number of call attempts represents a corrected capability of each switch taking into account external factors beyond control of each of said plurality of switches.

13. The telecommunications network of claim 11, wherein said network processor provides routing updates and recommendations to each of said plurality of switches in response to said switch occupancy index.

* * * * *